(12) United States Patent
Mochinaga et al.

(10) Patent No.: US 9,829,048 B2
(45) Date of Patent: Nov. 28, 2017

(54) BEARING DEVICE FOR WHEEL

(71) Applicants: Shuji Mochinaga, Shizuoka (JP); Takayuki Norimatsu, Shizuoka (JP)

(72) Inventors: Shuji Mochinaga, Shizuoka (JP); Takayuki Norimatsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 142 days.

(21) Appl. No.: 14/396,263

(22) PCT Filed: Apr. 24, 2013

(86) PCT No.: PCT/JP2013/062083
§ 371 (c)(1),
(2) Date: Oct. 22, 2014

(87) PCT Pub. No.: WO2013/161880
PCT Pub. Date: Oct. 31, 2013

(65) Prior Publication Data
US 2015/0321511 A1    Nov. 12, 2015

(30) Foreign Application Priority Data

Apr. 27, 2012  (JP) ................................ 2012-103578
May 8, 2012    (JP) ................................ 2012-106684
May 8, 2012    (JP) ................................ 2012-106691

(51) Int. Cl.
*B60B 27/00*    (2006.01)
*F16D 1/072*    (2006.01)
(Continued)

(52) U.S. Cl.
CPC .......... *F16D 1/072* (2013.01); *B60B 27/0005* (2013.01); *B60B 27/0026* (2013.01);
(Continued)

(58) Field of Classification Search
CPC ..... F16D 1/072; B60B 27/00; B60B 27/0026; B60B 27/0042; B60B 27/0005; B60B 27/0094; F16C 35/0635
See application file for complete search history.

(56) References Cited

U.S. PATENT DOCUMENTS 4,949,456 A  *  8/1990  Kovach ................... B23F 9/02
                                                     29/893.35
6,237,863 B1 *  5/2001  Smith ................. A01G 25/092
                                                     239/722
(Continued)

FOREIGN PATENT DOCUMENTS

JP    62-251522     11/1987
JP    2005-319889   11/2005
(Continued)

OTHER PUBLICATIONS

Japanese Office Action dated Dec. 16, 2015 in corresponding Japanese Patent Application No. 2014-115790 with partial English translation.

(Continued)

*Primary Examiner* — Kip T Kotter
*Assistant Examiner* — Scott A Browne
(74) *Attorney, Agent, or Firm* — Wenderoth, Lind & Ponack, L.L.P.

(57) ABSTRACT

A bearing device includes a bearing having an outer race with double-row outer raceway surfaces formed on its inner periphery, a hub wheel and an inner race having double-row inner raceway surfaces formed on outer peripheries thereof opposed to the outer raceway surfaces, and double-row rolling elements interposed between the outer and inner raceway surfaces. The bearing has a constant velocity universal joint separably coupled thereto with a screw fastening structure, in which a stem section of an outer joint member of the constant velocity universal joint is fitted to an inner (Continued)

diameter portion of the hub wheel, and in which a plurality of convex portions extending in an axial direction are formed on the stem section, and a plurality of concave portions having an interference with respect to only circumferential side wall portions of each of the plurality of convex portions are formed on the hub wheel.

13 Claims, 13 Drawing Sheets

(51) Int. Cl.

| | |
|---|---|
| *F16C 35/063* | (2006.01) |
| *F16C 19/18* | (2006.01) |
| *F16D 1/10* | (2006.01) |
| *F16D 3/223* | (2011.01) |
| *F16C 33/58* | (2006.01) |
| *F16C 19/52* | (2006.01) |

(52) U.S. Cl.
CPC ...... *B60B 27/0042* (2013.01); *B60B 27/0094* (2013.01); *F16C 35/0635* (2013.01); *B60B 27/00* (2013.01); *B60B 2380/12* (2013.01); *B60B 2380/73* (2013.01); *B60B 2900/113* (2013.01); *B60B 2900/212* (2013.01); *F16C 19/186* (2013.01); *F16C 19/527* (2013.01); *F16C 33/581* (2013.01); *F16C 2226/60* (2013.01); *F16C 2226/80* (2013.01); *F16C 2326/02* (2013.01); *F16D 2001/103* (2013.01); *F16D 2003/22326* (2013.01)

(56) References Cited

U.S. PATENT DOCUMENTS

| | | | | |
|---|---|---|---|---|
| 6,282,389 | B1* | 8/2001 | Matsuzaki | G03G 15/757 |
| | | | | 399/111 |
| 8,540,582 | B2* | 9/2013 | Ozawa | B60B 27/00 |
| | | | | 384/544 |
| 8,708,570 | B2* | 4/2014 | Umekida | F16D 3/223 |
| | | | | 384/542 |
| 8,851,962 | B2* | 10/2014 | Yanase | B23F 21/026 |
| | | | | 409/65 |
| 8,991,557 | B2* | 3/2015 | Arisawa | F02C 7/32 |
| | | | | 184/6.12 |
| 8,998,731 | B2* | 4/2015 | Umekida | F16D 1/0858 |
| | | | | 464/178 |
| 9,261,145 | B2* | 2/2016 | Nakagawa | B60B 27/0005 |
| 9,636,945 | B2* | 5/2017 | Mochinaga | F16D 1/06 |
| 9,656,517 | B2* | 5/2017 | Mochinaga | B60B 27/0026 |
| 2010/0092122 | A1 | 4/2010 | Fukumura et al. | |
| 2010/0220946 | A1 | 9/2010 | Ozawa et al. | |
| 2011/0009199 | A1 | 1/2011 | Yamauchi et al. | |
| 2011/0012420 | A1* | 1/2011 | Nakagawa | B60B 27/0005 |
| | | | | 301/110 |
| 2013/0025405 | A1* | 1/2013 | Arisawa | F01D 25/18 |
| | | | | 74/606 R |
| 2014/0274519 | A1* | 9/2014 | Bettin | B62M 9/00 |
| | | | | 474/152 |
| 2014/0284897 | A1* | 9/2014 | Bettin | B62K 25/005 |
| | | | | 280/260 |

FOREIGN PATENT DOCUMENTS

| | | | | |
|---|---|---|---|---|
| JP | 2006-316951 | | 11/2006 | |
| JP | 2008-230489 | | 10/2008 | |
| JP | 2009-97557 | | 5/2009 | |
| JP | WO 2009123254 A1 * | 10/2009 | ............ B60B 27/00 |
| JP | 2009-255729 | | 11/2009 | |
| JP | 2010-047059 | | 3/2010 | |
| JP | 2010-144902 | | 7/2010 | |
| JP | WO 2011099105 A1 * | 8/2011 | ......... F16H 57/0423 |
| JP | 5829173 | | 12/2015 | |
| WO | 2008/111525 | | 9/2008 | |
| WO | 2009/123254 | | 10/2009 | |
| WO | 2009/125657 | | 10/2009 | |
| WO | 2011/132706 | | 10/2011 | |

OTHER PUBLICATIONS

International Search Report dated Jul. 23, 2013 in International (PCT) Application No. PCT/JP2013/062083.
International Preliminary Report on Patentability and Written Opinion of the International Searching Authority dated Oct. 28, 2014 in International (PCT) Application No. PCT/JP2013/062083.
Office Action dated Jul. 27, 2016 in corresponding Japanese Application No. 2014-115790, with English translation.
Extended European Search Report dated Jul. 24, 2017 in corresponding European Patent Application No. 13782148.4.

* cited by examiner

BEARING DEVICE FOR WHEEL

TECHNICAL FIELD

The present invention relates to a bearing device for a wheel, which rotatably supports a driving wheel (front wheel of a front-engine front-drive (FF) vehicle, rear wheel of a front-engine rear-drive (FR) vehicle, and all wheels of a four-wheel drive (4WD) vehicle) with respect to a suspension device for an automobile, for example.

BACKGROUND ART

As a related-art bearing device for a wheel, for example, there is proposed a bearing device for a wheel, which is configured so that a hub wheel is separable from an outer joint member of a constant velocity universal joint to attain excellent maintainability (see, for example, Patent Literature 1). As illustrated in FIG. 11, the bearing device for a wheel as disclosed in Patent Literature 1 includes, as main components thereof, a fixed type constant velocity universal joint 106, and a bearing 120 for a wheel including a hub wheel 101, an inner race 102, double-row rolling elements 103 and 104, and an outer race 105.

The hub wheel 101 has an inner raceway surface 107 on an outboard side formed on an outer peripheral surface thereof, and includes a wheel mounting flange 109 for allowing a wheel (not shown) to be mounted thereto. Hub bolts 110 for fixing a wheel disc are equiangularly embedded in the wheel mounting flange 109. The inner race 102 is fitted to a small-diameter step portion 112 formed on an outer peripheral surface of the hub wheel 101 on the inboard side, and an inner raceway surface 108 on the inboard side is formed on an outer peripheral surface of the inner race 102.

The inner race 102 is press-fitted with adequate interference for the purpose of preventing creep. The inner raceway surface 107 on the outboard side that is formed on the outer peripheral surface of the hub wheel 101 and the inner raceway surface 108 on the inboard side that is formed on the outer peripheral surface of the inner race 102 constitute double-row inner raceway surfaces. The inner race 102 is press-fitted to the small-diameter step portion 112 of the hub wheel 101, and the end portion of the small-diameter step portion 112 is crimped outward. As a result, the inner race 102 is retained by a crimped portion 111 thus formed and integrated with the hub wheel 101, to thereby apply preload to the bearing 120 for a wheel.

The outer race 105 has double-row outer raceway surfaces 113 and 114 formed on an inner peripheral surface thereof and opposed to the inner raceway surfaces 107 and 108 of the hub wheel 101 and the inner race 102. An outer peripheral surface of the outer race 105 is fitted and fixed to a knuckle extending from a suspension device (not shown) of a vehicle body, and thus the bearing device for a wheel is mounted to the vehicle body.

The bearing 120 for a wheel has a double-row angular ball bearing structure. Specifically, the rolling elements 103 and 104 are interposed between the inner raceway surfaces 107 and 108 formed on the outer peripheral surfaces of the hub wheel 101 and the inner race 102 and the outer raceway surfaces 113 and 114 formed on the inner peripheral surface of the outer race 105, and the rolling elements 103 and 104 in respective rows are equiangularly supported by cages 115 and 116.

At opening portions on both ends of the bearing 120 for a wheel, a pair of seals 117 and 118 for sealing annular spaces between the outer race 105 and the hub wheel 101 and between the outer race 105 and the inner race 102 so as to be held in sliding-contact with the outer peripheral surfaces of the hub wheel 101 and the inner race 102 are fitted to the inner diameter portions at both end portions of the outer race 105. Further, the seals 117 and 118 prevent leakage of grease filled inside and entrance of water and foreign matter from the outside.

The constant velocity universal joint 106 is provided at one end of an intermediate shaft 122 that constitutes a drive shaft 121. The constant velocity universal joint 106 includes the outer joint member 124 having track grooves 123 formed in an inner peripheral surface thereof, an inner joint member 126 having track grooves 125 formed in an outer peripheral surface thereof so as to be opposed to the track grooves 123 of the outer joint member 124, balls 127 built into spaces between the track grooves 123 of the outer joint member 124 and the track grooves 125 of the inner joint member 126, and a cage 128 interposed between the inner peripheral surface of the outer joint member 124 and the outer peripheral surface of the inner joint member 126 to retain the balls 127.

The outer joint member 124 includes a mouth section 129 that accommodates internal components such as the inner joint member 126, the balls 127, and the cage 128, and a stem section 130 that integrally extends from the mouth section 129 in an axial direction. An axial end of the intermediate shaft 122 is press-fitted to the inner joint member 126, and is coupled by spline fitting to allow torque transmission therebetween.

A bellows-like boot 131 made of a resin is mounted between the outer joint member 124 of the constant velocity universal joint 106 and the intermediate shaft 122 to prevent leakage of a lubricant such as grease filled inside the joint, and to prevent entrance of foreign matter from outside the joint, thereby attaining a structure of closing an opening portion of the outer joint member 124 with the boot 131.

The boot 131 includes a large-diameter end portion 133 fastened and fixed with a boot band 132 on an outer peripheral surface of the outer joint member 124, a small-diameter end portion 135 fastened and fixed with a boot band 134 on an outer peripheral surface of the intermediate shaft 122, and a flexible bellows portion 136 connecting the large-diameter end portion 133 and the small-diameter end portion 135, and reduced in diameter in a range of from the large-diameter end portion 133 toward the small-diameter end portion 135.

FIG. 12 illustrates a state before press-fitting the stem section 130 of the outer joint member 124 to a shaft hole 138 of the hub wheel 101. As illustrated in FIG. 12, a male spline including a plurality of convex portions 137 extending in the axial direction is formed on an outer peripheral surface of the stem section 130 of the outer joint member 124. On the other hand, a simple cylindrical portion 139 having no female spline formed thereon is provided to an inner peripheral surface of the shaft hole 138 of the hub wheel 101.

FIG. 13 illustrates a state after press-fitting the stem section 130 of the outer joint member 124 to the shaft hole 138 of the hub wheel 101. The stem section 130 of the outer joint member 124 is press-fitted to the shaft hole 138 of the hub wheel 101, and the shape of the convex portions 137 of the stem section 130 is transferred to the inner peripheral surface of the shaft hole 138 of the hub wheel 101. Thus, as illustrated in FIG. 13, concave portions 140 brought into close contact with the convex portions 137 with an interference therebetween are formed on the inner peripheral surface of the shaft hole 138 of the hub wheel 101. In this manner, there is attained a convex and concave fitting structure in which the convex portions 137 and the concave portions 140 are brought into close contact with each other at an entire fitting contact portion therebetween, with the result that the outer joint member 124 and the hub wheel 101 are coupled to each other to allow torque transmission therebetween.

As described above, under the state in which the stem section 130 of the outer joint member 124 is press-fitted to the shaft hole 138 of the hub wheel 101, as illustrated in FIG. 11, a bolt 142 is threadedly engaged with a female thread 141 formed at an axial end of the stem section 130 of the outer joint member 124, and is therefore fastened in a state of being locked at an end surface of the hub wheel 101, to thereby fix the constant velocity universal joint 106 to the hub wheel 101.

CITATION LIST

Patent Literature 1: JP 2009-97557 A

SUMMARY OF INVENTION

Technical Problems

By the way, in the above-mentioned bearing device for a wheel, the fixed type constant velocity universal joint 106 to be coupled to the bearing 120 for a wheel including the hub wheel 101, the inner race 102, the double-row rolling elements 103 and 104, and the outer race 105 constitutes a part of the drive shaft 121. It is necessary that the drive shaft 121 for transmitting power from an engine to a wheel of an automobile be adaptable to angular displacement and axial displacement caused by a change in relative positional relationship between the engine and the wheel, and hence, as in the structure illustrated in FIG. 14, a plunging type constant velocity universal joint 151 and the fixed type constant velocity universal joint 106 are generally installed on the engine side (inboard side) and the wheel side (outboard side), respectively, and both the constant velocity universal joints 106 and 151 are coupled to each other through the intermediate shaft 122.

In this case, in the related-art bearing device for a wheel, as illustrated in FIG. 12, the simple cylindrical portion 139 having no female spline formed thereon is provided to the inner peripheral surface of the shaft hole 138 of the hub wheel 101. Therefore, when press-fitting the stem section 130 of the outer joint member 124 to the shaft hole 138 of the hub wheel 101, a significant press-fitting load is necessary to transfer the shape of the convex portions 137 of the stem section 130 to the inner peripheral surface of the shaft hole 138. Further, as illustrated in FIG. 13, the interference is set within a range a, in which the concave portion 140 of the shaft hole 138 and the convex portion 137 of the stem section 130 are brought into close contact with each other (range of from a mountainside part to a mountaintop part of the above-mentioned convex portion 137). Also in this respect, a significant press-fitting load is necessary and thus the workability is poor. Therefore, it is necessary to use a press machine or the like. For this reason, in the current circumstances, the bearing device for a wheel needs to be assembled to the vehicle body under a state in which the constant velocity universal joint 106 of the drive shaft 121 is assembled to the bearing 120 for a wheel.

As a result, at the time of assembling the vehicle in an automobile manufacturer, the bearing device for a wheel is handled under a state in which the bearing 120 for a wheel and the constant velocity universal joint 106 of the drive shaft 121 are coupled to each other, that is, under a state in which the bearing 120 for a wheel and the two constant velocity universal joints 106 and 151 of the drive shaft 121 are integrated with each other. The minimum inner diameter dimension of a knuckle 152 (see FIG. 14) extending from the suspension device of the vehicle body is set larger than the maximum outer diameter dimension of the constant velocity universal joints 106 and 151, and hence the bearing device for a wheel is assembled to the vehicle body by, as illustrated in FIGS. 14 and 15, sequentially inserting the plunging type constant velocity universal joint 151 and the fixed type constant velocity universal joint 106 of the drive shaft 121 through the knuckle 152 extending from the suspension device of the vehicle body, and then fitting and fixing the outer race 105 of the bearing 120 for a wheel to the knuckle 152.

The drive shaft 121 is an elongated assembly unit connecting the wheel side and the engine side, and hence the workability is poor in the above-mentioned method of assembling the bearing device for a wheel to the vehicle body by sequentially inserting the plunging type constant velocity universal joint 151 and the fixed type constant velocity universal joint 106 of the drive shaft 121 through the knuckle 152. As a result, the components of the drive shaft 121 may be damaged at the time of assembling the bearing device for a wheel.

Therefore, the present invention has been proposed in view of the above-mentioned problems, and it is an object thereof to provide a bearing device for a wheel, which is capable of enhancing workability when assembling the bearing device to a vehicle body and forestalling damage to components at the time of assembling the bearing device.

Solution to Problems

As a technical measure to achieve the above-mentioned object, the present invention provides a bearing device for a wheel, comprising a bearing for a wheel comprising: an outer member having double-row outer raceway surfaces formed on an inner periphery thereof; an inner member comprising a hub wheel and an inner race, the inner member having double-row inner raceway surfaces formed on an outer periphery thereof so as to be opposed to the double-row outer raceway surfaces; and double-row rolling elements interposed between the double-row outer raceway surfaces of the outer member and the double-row inner raceway surfaces of the inner member, the bearing for a wheel having a constant velocity universal joint separably coupled thereto with a screw fastening structure, in which a stem section of an outer joint member of the constant velocity universal joint is fitted to an inner diameter portion of the hub wheel, wherein a plurality of convex portions extending in an axial direction are formed on one of the hub wheel and the stem section of the outer joint member, and a plurality of concave portions having an interference with respect to only circumferential side wall portions of each of the plurality of convex portions are formed on another of the hub wheel and the stem section of the outer joint member, and the stem section of the outer joint member is press-fitted to the hub wheel, and a shape of only the circumferential side wall portions of the each of the plurality of convex portions is transferred to the another of the hub wheel and the stem section of the outer joint member, to thereby provide a convex and concave fitting structure in which the plurality of convex portions and the plurality of concave portions are brought into close contact with each other at an entire fitting contact portion therebetween.

The description: "only the circumferential side wall portions of the each of the plurality of convex portions" herein means a portion except for the distal end portion of the convex portion in the radial direction. Further, the concave portion having the interference with respect to only the circumferential side wall portions of the convex portion is easily attained by a structure in which the circumferential dimension of the concave portion is set smaller than that of the convex portion.

In the present invention, the plurality of convex portions extending in the axial direction are formed on one of the hub wheel and the stem section of the outer joint member, and the concave portions having the interference with respect to only the circumferential side wall portions of the each of the convex portions are formed in advance on another of the hub wheel and the stem section of the outer joint member. The stem section of the outer joint member is press-fitted to the hub wheel, to thereby provide the convex and concave fitting structure in which the convex portions and the concave portions are brought into close contact with each other at the entire fitting contact portion therebetween.

In this case, the shape of only the circumferential side wall portions of the each of the convex portions is transferred to the mating surface on which the concave portion is formed while involving extremely small plastic deformation and cutting work with only the circumferential side wall portions of the each of the convex portions. At this time, the circumferential side wall portions of the each of the convex portions dig into the mating surface on which the concave portion is formed so that the inner diameter of the hub wheel is slightly increased. Thus, relative movement of the convex portions in the axial direction is allowed in this state. When the relative movement of the convex portions in the axial direction is stopped, the inner diameter of the hub wheel is reduced to recover the original diameter. Thus, the convex portions and the concave portions are brought into close contact with each other at the entire fitting contact portion therebetween, with the result that the outer joint member and the hub wheel can firmly be coupled to and integrated with each other. Note that, the portion except for the circumferential side wall portions of the each of the convex portions, that is, the distal end portion of the convex portion in the radial direction does not have the interference with respect to the concave portion. Therefore, the shape of the distal end portion of the convex portion in the radial direction is not transferred to the mating surface on which the concave portion is formed.

In this case, the concave portions having the interference with respect to the convex portions are formed in advance, and hence the press-fitting load to be applied when the convex portions and the concave portions are brought into close contact with each other at the entire fitting contact portion therebetween can further be reduced as compared to the related art in which the shape of the convex portions is transferred to the simple cylindrical portion. Further, the interference is set with respect to only the circumferential side wall portions of the each of the convex portions, and thus the press-fitting load can further be reduced as compared to the related art in which the interference is set within the range including the distal end portion of the convex portion in the radial direction. As a result, after the bearing for a wheel is mounted to the vehicle body, the outer joint member is press-fitted to the hub wheel of the bearing for a wheel so that the constant velocity universal joint can be coupled to the bearing for a wheel. Thus, the workability can be enhanced.

In the present invention, it is desired that a surface hardness of the each of the plurality of convex portions be set larger than a surface hardness of the each of the plurality of concave portions. With this structure, when press-fitting the stem section of the outer joint member to the hub wheel, through the plastic deformation and the cutting work, the shape of the convex portions can easily be transferred to the mating surface on which the concave portion is formed.

In the present invention, it is desired that a module of the convex and concave fitting structure be defined within a range of from 0.3 to 0.75. When the module of the convex and concave fitting structure is defined within the range of from 0.3 to 0.75 as described above, the torque transmission capacity can sufficiently be secured between the hub wheel of the bearing for a wheel and the stem section of the outer joint member of the constant velocity universal joint, and the press-fitting load to be applied when press-fitting the stem section of the outer joint member to the hub wheel can be reduced reliably, thereby being capable of easily coupling the constant velocity universal joint to the bearing for a wheel. Thus, the workability can be enhanced.

In the present invention, it is desired that a ratio of a pitch circle diameter to a fitting length in the convex and concave fitting structure be defined within a range of from 2.0 to 3.0. When the ratio of the pitch circle diameter to the fitting length in the convex and concave fitting structure is defined within the range of from 2.0 to 3.0 as described above, the press-fitting load to be applied when press-fitting the stem section of the outer joint member to the hub wheel can be reduced reliably, thereby being capable of easily coupling the constant velocity universal joint to the bearing for a wheel. Thus, the workability can be enhanced. Further, the shear strength of the convex portion can be enhanced, thereby being capable of securing a sufficient strength in the convex and concave fitting structure.

In the present invention, it is desired that the outer joint member be configured to be press-fitted to the hub wheel due to a force that is equal to or smaller than an axial force generated by the screw fastening structure. With this structure, there is no need to separately prepare a dedicated jig when press-fitting the outer joint member to the hub wheel of the bearing for a wheel after the bearing for a wheel is mounted to the vehicle body. Instead, the constant velocity universal joint can easily be coupled to the bearing for a wheel with the screw fastening structure that is a component of the bearing device for a wheel.

In the present invention, it is desired that a fastening torque of the screw fastening structure be set lower than a fastening torque to be applied at the time of press-fitting the outer joint member to the hub wheel. As described above, after press-fitting the outer joint member to the hub wheel, the screw fastening state is temporarily loosened, and the fastening torque is set again to a fastening torque that is lower than the fastening torque applied at the time of press-fitting the outer joint member to the hub wheel. Thus, the contact pressure to be generated at an abutment surface between the bearing for a wheel and the constant velocity universal joint can be controlled optimally, thereby being capable of forestalling the stick-slip noise that may be caused by abrupt sliding at the abutment surface therebetween.

The screw fastening structure of the present invention may be a structure comprising: a female thread portion formed at an axial end of the stem section of the outer joint member; and a male thread portion to be locked at the hub wheel in a state of being threadedly engaged with the female thread portion. In this structure, the male thread portion is threadedly engaged with the female thread portion of the stem section, and is therefore fastened in a state of being locked at the hub wheel, to thereby fix the constant velocity universal joint to the hub wheel.

The screw fastening structure of the present invention may be a structure comprising: a male thread portion formed at an axial end of the stem section of the outer joint member; and a female thread portion to be locked at the hub wheel in a state of being threadedly engaged with the male thread portion. In this structure, the female thread portion is threadedly engaged with the male thread portion of the stem section, and is therefore fastened in a state of being locked at the hub wheel, to thereby fix the constant velocity universal joint to the hub wheel.

In the present invention, it is desired that the plurality of convex portions be provided on the stem section of the outer joint member, and the plurality of concave portions be provided on the hub wheel. With this structure, the convex and concave fitting structure in which the convex portions and the concave portions are brought into close contact with each other at the entire fitting contact portion therebetween can easily be provided when press fitting the stem section of the outer joint member to the hub wheel through transfer of the shape of the convex portions of the stem section to the surface of the hub wheel on which the concave portion is formed.

In the present invention, it is desired that the convex and concave fitting structure be a structure comprising an accommodating portion for accommodating a flash portion generated due to transfer of the shape of the plurality of convex portions through press fitting. With this structure, the flash portion generated due to the transfer of the shape of the convex portions through press fitting can be kept in the accommodating portion, thereby being capable of inhibiting the flash portion from entering, for example, the inside of the vehicle that is positioned outside the device.

In the present invention, it is desired that the convex and concave fitting structure be a structure further comprising a guide portion for guiding a start of the press fitting. With this structure, when press-fitting the stem section of the outer joint member to the hub wheel, stable press fitting can be carried out to prevent axial misalignment, axial inclination, and the like at the time of press fitting.

Advantageous Effects of Invention

According to one embodiment of the present invention, a plurality of convex portions extending in an axial direction are formed on one of the hub wheel and the stem section of the outer joint member, and a plurality of concave portions having an interference with respect to only circumferential side wall portions of each of the plurality of convex portions are formed on another of the hub wheel and the stem section of the outer joint member, and the stem section of the outer joint member is press-fitted to the hub wheel, and the shape of only the circumferential side wall portions of the each of the convex portions is transferred to the another of the hub wheel and the stem section of the outer joint member, to thereby provide the convex and concave fitting structure in which the convex portions and the concave portions are brought into close contact with each other at the entire fitting contact portion therebetween. Therefore, the concave portions having the interference with respect to only the circumferential side wall portions of the each of the convex portions are formed in advance, and hence the press-fitting load to be applied when the convex portions and the concave portions are brought into close contact with each other at the entire fitting contact portion therebetween can be reduced. As a result, after the bearing for a wheel is mounted to the vehicle body, the outer joint member can be press-fitted to the hub wheel of the bearing for a wheel so that the constant velocity universal joint is easily coupled to the bearing for a wheel. Thus, the workability can be enhanced when assembling the bearing device for a wheel to the vehicle body, and the damage to the components can be forestalled at the time of assembling the bearing device for a wheel.

DESCRIPTION OF EMBODIMENTS

Figure 1:
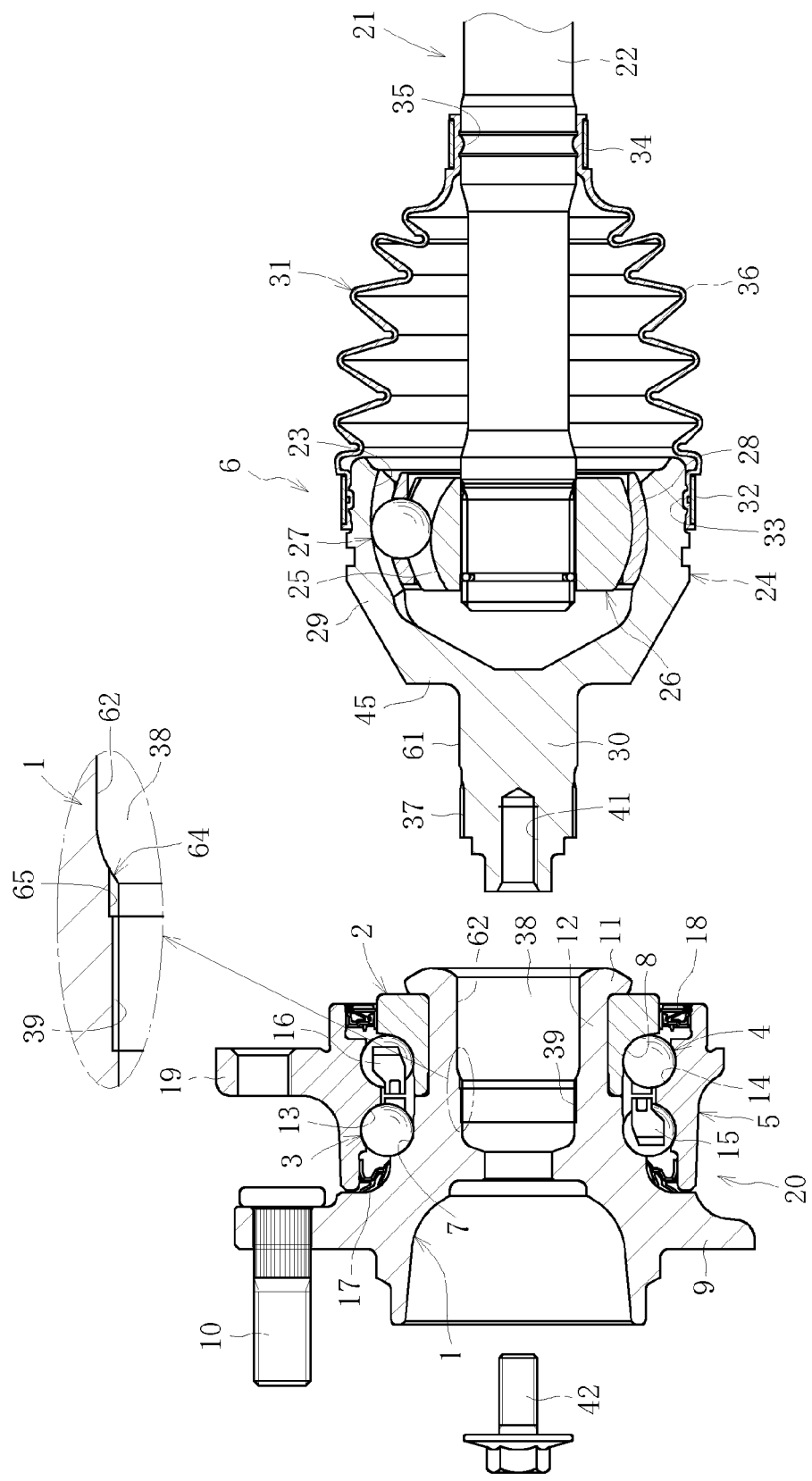
FIG. 1 is a vertical sectional view illustrating a state before assembling a constant velocity universal joint to a bearing for a wheel in a bearing device for a wheel according to an embodiment of the present invention.
Figure 2:
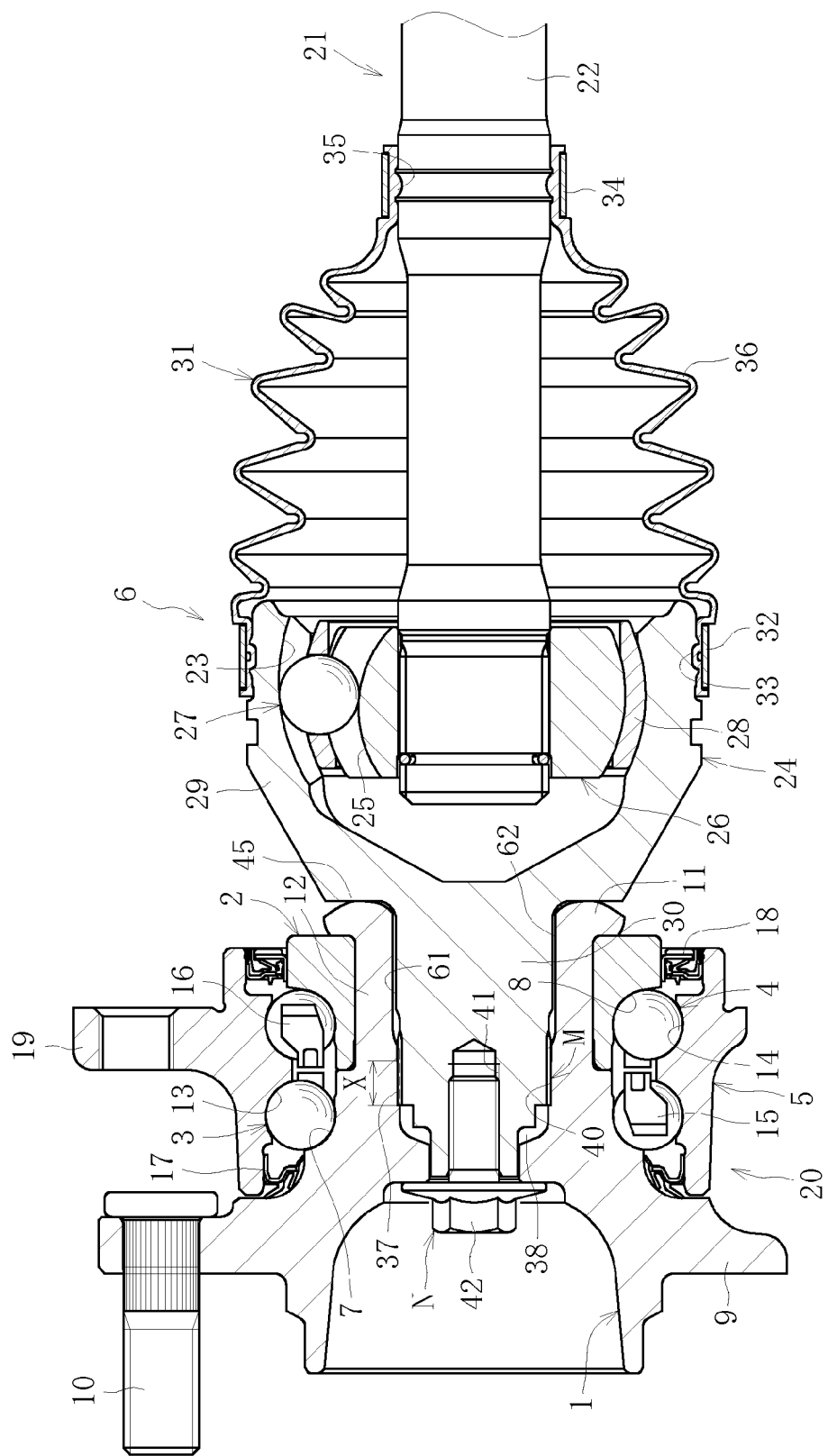
FIG. 2 is a vertical sectional view illustrating a state after assembling the constant velocity universal joint to the bearing for a wheel of FIG. 1.

Now, a bearing device for a wheel according to embodiments of the present invention is described in detail. A bearing device for a wheel illustrated in FIGS. 1 and 2 comprises, as main components thereof, a constant velocity universal joint 6, and a bearing 20 for a wheel comprising a hub wheel 1 and an inner race 2 that serve as an inner member, double-row rolling elements 3 and 4, and an outer race 5. FIG. 1 illustrates a state before assembling the constant velocity universal joint 6 to the bearing 20 for a wheel, and FIG. 2 illustrates a state after assembling the constant velocity universal joint 6 to the bearing 20 for a wheel. Note that, in the following description, an outer side of a vehicle in a state in which the bearing device for a wheel is assembled to the vehicle is referred to as an outboard side (left side in the figures), and a middle side of the vehicle is referred to as an inboard side (right side in the figures).

The hub wheel 1 has an inner raceway surface 7 on the outboard side formed on an outer peripheral surface thereof, and comprises a wheel mounting flange 9 for allowing a wheel (not shown) to be mounted thereto. Hub bolts 10 for fixing a wheel disc are equiangularly embedded in the wheel mounting flange 9. The inner race 2 is fitted to a small-diameter step portion 12 formed on an outer peripheral surface of the hub wheel 1 on the inboard side, and an inner raceway surface 8 on the inboard side is formed on an outer peripheral surface of the inner race 2.

The inner race 2 is press-fitted with adequate interference for the purpose of preventing creep. The inner raceway surface 7 on the outboard side that is formed on the outer peripheral surface of the hub wheel 1 and the inner raceway surface 8 on the inboard side that is formed on the outer peripheral surface of the inner race 2 constitute double-row raceway surfaces. The inner race 2 is press-fitted to the small-diameter step portion 12 of the hub wheel 1, and the end portion of the small-diameter step portion 12 is crimped outward by orbital forming. As a result, the inner race 2 is retained by a crimped portion 11 and integrated with the hub wheel 1, to thereby apply preload to the bearing 20 for a wheel.

The outer race 5 has double-row outer raceway surfaces 13 and 14 formed on an inner peripheral surface thereof so as to be opposed to the raceway surfaces 7 and 8 of the hub wheel 1 and the inner race 2, and comprises a vehicle body mounting flange 19 for being mounted to a knuckle 52 extending from a suspension device of a vehicle body (not shown). As described later, the vehicle body mounting flange 19 is fitted to the above-mentioned knuckle 52, and is fixed thereto with bolts 63 (see FIG. 3).

The bearing 20 for a wheel has a double-row angular ball bearing structure. Specifically, the rolling elements 3 and 4 are interposed between the inner raceway surfaces 7 and 8 formed on the outer peripheral surfaces of the hub wheel 1 and the inner race 2 and the outer raceway surfaces 13 and 14 formed on the inner peripheral surface of the outer race 5, and the rolling elements 3 and 4 in respective rows are equiangularly supported by cages 15 and 16.

At opening portions on both ends of the bearing 20 for a wheel, a pair of seals 17 and 18 for sealing annular spaces between the outer race 5 and the hub wheel 1 and between the outer race 5 and the inner race 2 so as to be held in sliding-contact with the outer peripheral surfaces of the hub wheel 1 and the inner race 2 are fitted to the inner diameter portions at both end portions of the outer race 5. Further, the seals 17 and 18 prevent leakage of grease filled inside and entrance of water and foreign matter from the outside.

The constant velocity universal joint 6 is provided at one end of an intermediate shaft 22 that constitutes a drive shaft 21. The constant velocity universal joint 6 comprises the outer joint member 24 having track grooves 23 formed in an inner peripheral surface thereof, an inner joint member 26 having track grooves 25 formed in an outer peripheral surface thereof so as to be opposed to the track grooves 23 of the outer joint member 24, balls 27 built into spaces between the track grooves 23 of the outer joint member 24 and the track grooves 25 of the inner joint member 26, and a cage 28 interposed between the inner peripheral surface of the outer joint member 24 and the outer peripheral surface of the inner joint member 26 to retain the balls 27.

The outer joint member 24 comprises a mouth section 29 that accommodates internal components such as the inner joint member 26, the balls 27, and the cage 28, and a stem section 30 that integrally extends from the mouth section 29 in an axial direction. An axial end of the intermediate shaft 22 is press-fitted to the inner joint member 26, and is coupled by spline fitting to allow torque transmission therebetween.

A bellows-like boot 31 made of a resin is mounted between the outer joint member 24 of the constant velocity universal joint 6 and the intermediate shaft 22 to prevent leakage of a lubricant such as grease filled inside the joint, and to prevent entrance of foreign matter from outside the joint, thereby attaining a structure of closing an opening portion of the outer joint member 24 with the boot 31.

The boot 31 comprises a large-diameter end portion 33 fastened and fixed with a boot band 32 on an outer peripheral surface of the outer joint member 24, a small-diameter end portion 35 fastened and fixed with a boot band 34 on an outer peripheral surface of the intermediate shaft 22, and a flexible bellows portion 36 connecting the large-diameter end portion 33 and the small-diameter end portion 35, and reduced in diameter in a range of from the large-diameter end portion 33 toward the small-diameter end portion 35.

In this bearing device for a wheel, a columnar fitting surface 61 is formed on an outer peripheral surface of the stem section 30 of the outer joint member 24 on the inboard side, and a male spline comprising a plurality of convex portions 37 extending in the axial direction is formed on an outer peripheral surface of the stem section 30 on the outboard side. On the other hand, a cylindrical fitting surface 62 is formed on an inner peripheral surface of a shaft hole 38 of a hub wheel 1 on the inboard side, and a plurality of concave portions 39 having an interference with respect to only circumferential side wall portions 43 of each of the above-mentioned convex portions 37 are formed on an inner peripheral surface of the shaft hole 38 on the outboard side (see FIG. 7B). Note that, the above-mentioned convex portions 37 are formed into a tooth-like shape with a trapezoidal cross section, but may be formed into an involute tooth-like shape.

In this bearing device for a wheel, the stem section 30 of the outer joint member 24 is press-fitted to the shaft hole 38 of the hub wheel 1, and the shape of only the circumferential side wall portions 43 (see FIG. 7B) of each of the convex portions 37 is transferred to the shaft hole 38 of the hub wheel 1 serving as a mating surface on which the concave portion is formed, to thereby form concave portions 40. In this manner, there is attained a convex and concave fitting structure M in which the convex portions 37 and the concave portions 40 are brought into close contact with each other at an entire fitting contact portion X therebetween (see FIG. 2). Note that, it is preferred that materials for the outer joint member 24 and the hub wheel 1 be medium carbon steel for a machine structure, which is typified by S53C or the like.

This bearing device for a wheel comprises the following screw fastening structure N (see FIG. 2). This screw fastening structure N comprises a female thread portion 41 formed at an axial end of the stem section 30 of the outer joint member 24, and a bolt 42 serving as a male thread portion to be locked at the hub wheel 1 in a state of being threadedly engaged with the female thread portion 41. In this structure, the bolt 42 is threadedly engaged with the female thread portion 41 of the stem section 30, and is therefore fastened in a state of being locked at the hub wheel 1, to thereby fix the constant velocity universal joint 6 to the hub wheel 1. Note that, the bearing 20 for a wheel has a structure in which the inner race 2 is retained by a crimping portion 11 and integrated with the hub wheel 1. Thus, the bearing 20 for a wheel is separable from the outer joint member 24 of the constant velocity universal joint 6.

By the way, in this bearing device for a wheel, the crimping portion 11 of the hub wheel 1 of the bearing 20 for a wheel and a shoulder portion 45 of the outer joint member 24 are in a contact state of being held in abutment against each other. Therefore, for example, there is a risk in that, at the time of starting a vehicle, stick-slip noise commonly referred to as "squeaking noise" is generated between the crimping portion 11 of the hub wheel 1 and the shoulder portion 45 of the outer joint member 24. The stick-slip noise is generated in the following manner. That is, when rotational torque is applied from the outer joint member 24 of the constant velocity universal joint 6 to the hub wheel 1 of the bearing 20 for a wheel in a stationary state at the time of starting the vehicle, the rotational torque is to be transmitted from the outer joint member 24 to the hub wheel 1, but the torque transmitted between the outer joint member 24 and the bearing 20 for a wheel fluctuates and the outer joint member 24 twists, with the result that abrupt sliding occurs at an abutment surface between the crimping portion 11 of the hub wheel 1 and the shoulder portion 45 of the outer joint member 24. This abrupt sliding causes the stick-slip noise.

As means for forestalling the stick-slip noise, the fastening torque of the above-mentioned screw fastening structure N is set lower than a fastening torque to be applied at the time of press-fitting the outer joint member 24 to the hub wheel 1. That is, after press-fitting the outer joint member 24 to the hub wheel 1, the screw fastening state is temporarily loosened, and the fastening torque is set again to a fastening torque that is lower than the fastening torque applied at the time of press-fitting the outer joint member 24 to the hub wheel 1. Thus, the contact pressure to be generated at the abutment surface between the crimping portion 11 of the hub wheel 1 and the shoulder portion 45 of the outer joint member 24 can be controlled optimally, thereby being capable of forestalling the stick-slip noise that may be caused by the abrupt sliding at the abutment surface therebetween.

In this bearing device for a wheel, the fixed type constant velocity universal joint 6 to be coupled to the bearing 20 for a wheel comprising the hub wheel 1, the inner race 2, the double-row rolling elements 3 and 4, and the outer race 5 constitutes a part of the drive shaft 21. It is necessary that the drive shaft 21 for transmitting power from an engine to a wheel of an automobile be adaptable to angular displacement and axial displacement caused by a change in relative positional relationship between the engine and the wheel, and hence, as in the structure illustrated in FIG. 3, a plunging type constant velocity universal joint 51 and the fixed type constant velocity universal joint 6 are generally installed on the engine side (inboard side) and the wheel side (outboard side), respectively, and both the constant velocity universal joints 6 and 51 are coupled to each other through the intermediate shaft 22.

Figure 4:
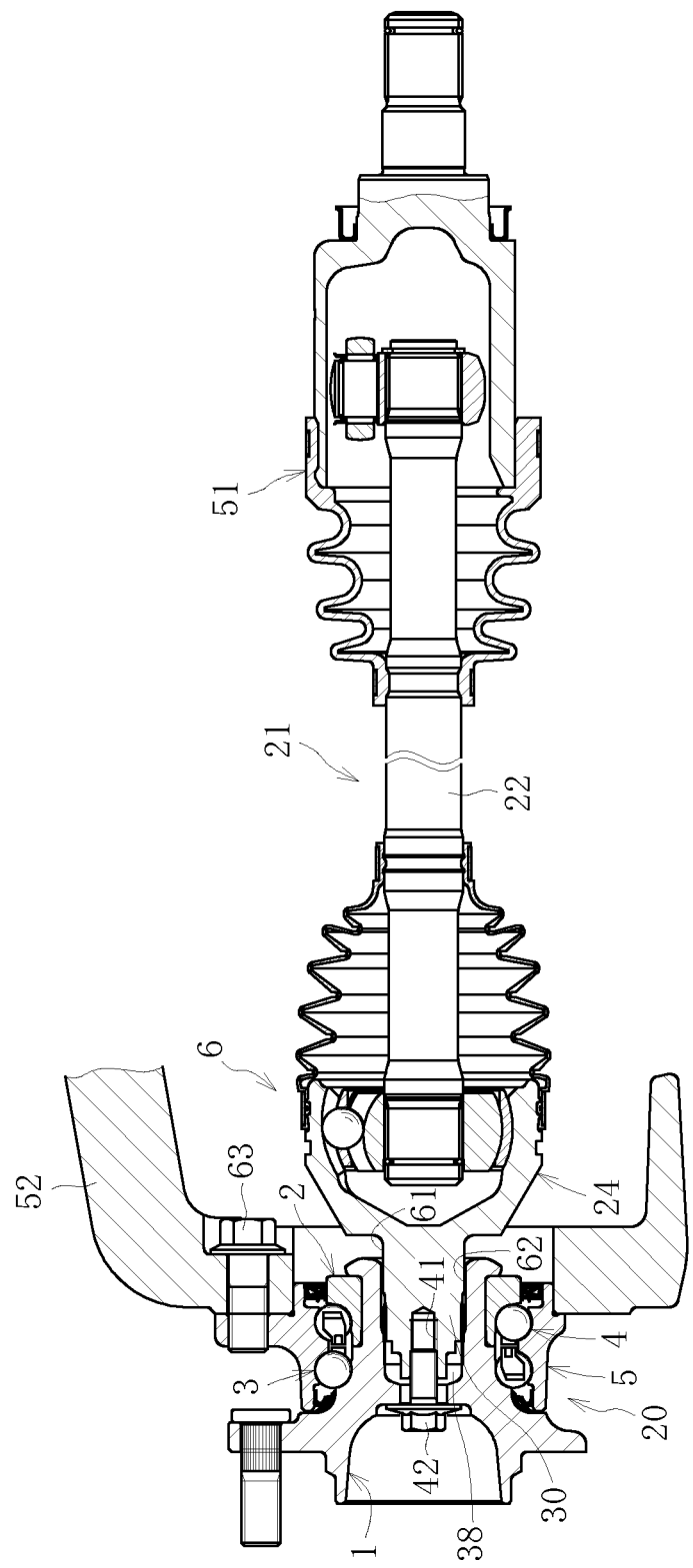
FIG. 4 is a sectional view illustrating a state in the middle of assembling the constant velocity universal joint of the drive shaft to the bearing for a wheel, which is mounted to the knuckle.

As illustrated in FIG. 4, prior to press-fitting the stem section 30 of the outer joint member 24 to the shaft hole 38 of the hub wheel 1, the columnar fitting surface 61 is formed on the outer peripheral surface of the stem section 30 on the inboard side, and the cylindrical fitting surface 62 is formed on the inner peripheral surface of the shaft hole 38 of the hub wheel 1 on the inboard side. Thus, the axial alignment of the stem section 30 with the hub wheel 1 can easily be carried out by fitting the fitting surface 61 of the stem section 30 to the fitting surface 62 of the shaft hole 38 of the hub wheel 1.

Figure 6A:
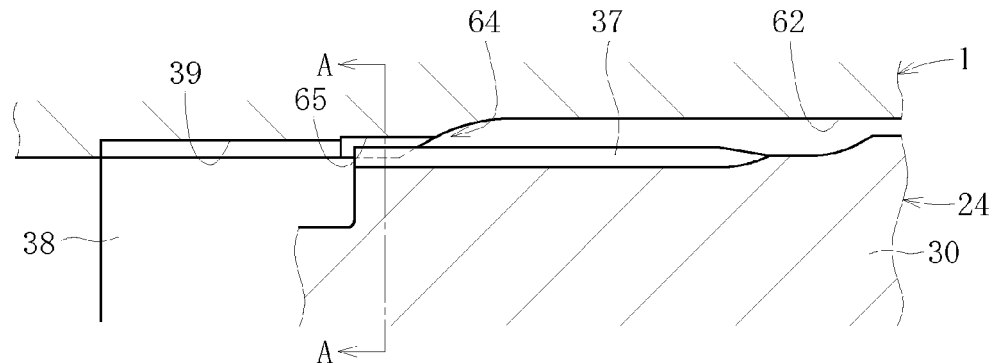
FIG. 6A is an enlarged main part sectional view illustrating a state before press-fitting a stem section of an outer joint member to a hub wheel of the bearing for a wheel.
Figure 6B:
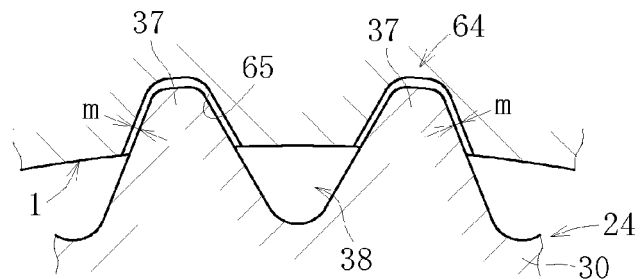
FIG. 6B is a sectional view taken along the line A-A of FIG. 6A.

Further, as illustrated in FIGS. 6A and 6B, a guide portion 64 for guiding the start of the press fitting is provided between the fitting surface 62 positioned on the inboard side of the hub wheel 1 and the concave portions 39 positioned on the outboard side thereof. The guide portion 64 comprises concave portions 65 formed relatively larger than the convex portions 37 of the stem section 30 (see the enlarge portion of FIG. 1). That is, gaps m are formed between the convex portions 37 and the concave portions 65 (see FIG. 6B). When press-fitting the stem section 30 of the outer joint member 24 to the hub wheel 1, the guide portion 64 can guide the convex portions 37 of the stem section 30 so that the convex portions 37 are reliably press-fitted to the concave portions 39 of the hub wheel 1. Thus, stable press fitting can be carried out to prevent axial misalignment, axial inclination, and the like at the time of press fitting.

Figure 12:
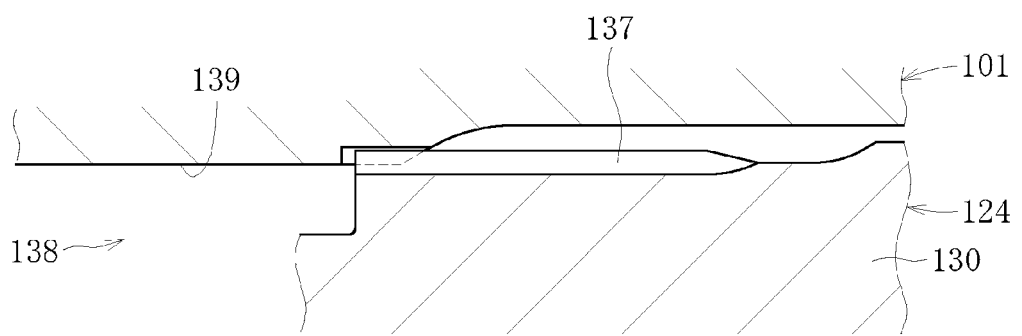
FIG. 12 is an enlarged main part vertical sectional view illustrating a state before press-fitting a stem section of an outer joint member to a shaft hole of a hub wheel in the bearing device for a wheel of FIG. 11.

As illustrated in FIGS. 7A, 7B, 8A, and 8B, the shape of only the circumferential side wall portions 43 of each of the convex portions 37 is transferred to the shaft hole 38 of the hub wheel 1 to form the concave portions 40 at the time of press fitting the stem section 30 to the hub wheel 1. At this time, the concave portions 39 that correspond to the convex portions 37 are formed in advance (see FIG. 6A), and hence the press-fitting load for bringing the convex portions 37 and the concave portions 40 into close contact with each other at the entire fitting contact portion X therebetween (see FIG. 2) can further be reduced as compared to the related art in which the shape of the convex portions 137 is transferred to the cylindrical portion 139 (see FIG. 12). Note that, a distal end portion 44 of each convex portion 37 in a radial direction does not have any interference with respect to the corresponding concave portion 39, and hence the shape of the distal end portion 44 of the convex portion 37 in the radial direction is not transferred to the concave portion 39.

In this case, the circumferential dimension of the above-mentioned concave portion 39 is set smaller than that of the convex portion 37 so that the concave portion 39 may have an interference n with respect to only the circumferential side wall portions 43 of the convex portion 37. Further, the portion except for the circumferential side wall portions 43 of the convex portion 37, that is, the distal end portion 44 of the convex portion 37 in the radial direction does not have the interference with respect to the concave portion 39. Therefore, the radial dimension of the concave portion 39 is set larger than that of the convex portion 37, and thus the concave portion 39 has a clearance p from the distal end portion 44 of the convex portion 37 in the radial direction.

Figure 13:
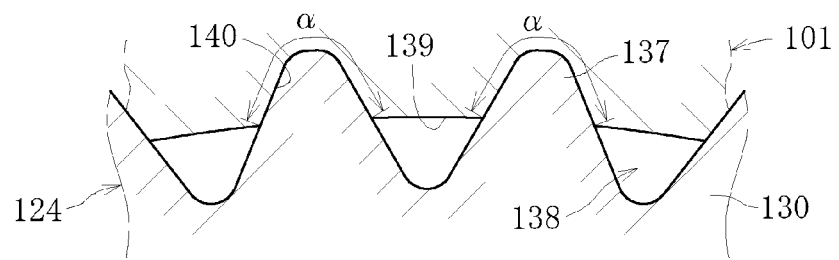
FIG. 13 is an enlarged main part lateral sectional view illustrating a state after press-fitting the stem section of the outer joint member to the shaft hole of the hub wheel in the bearing device for a wheel of FIG. 11.
Figure 14:
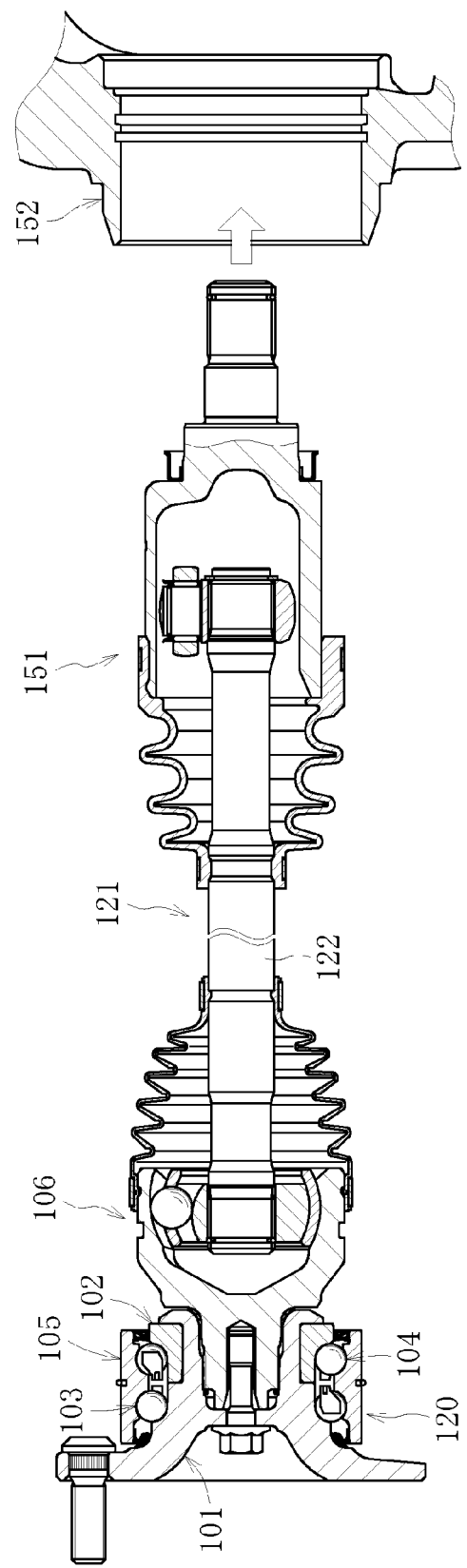
FIG. 14 is a sectional view illustrating a state before mounting, to a knuckle, a bearing device for a wheel having a drive shaft assembled thereto.
Figure 15:
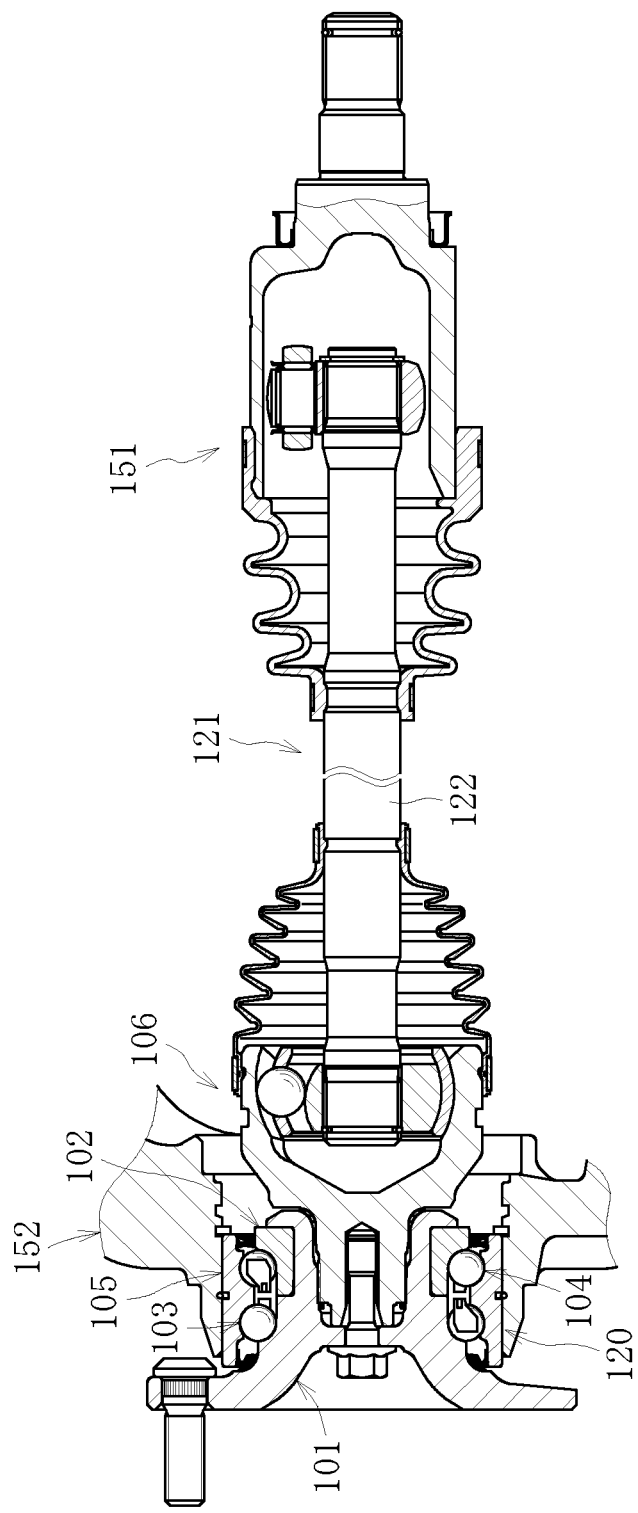
FIG. 15 is a sectional view illustrating a state after mounting, to the knuckle, the bearing device for a wheel having the drive shaft assembled thereto.

As described above, the interference n is set with respect to only the circumferential side wall portions 43 of the convex portion 37, and thus the press-fitting load can further be reduced as compared to the related art in which the interference is set within the range including the distal end portion of the convex portion 137 in the radial direction, that is, within the range a of from the mountainside part to the mountaintop part of the convex portion 137 (see FIG. 13).

Figure 3:
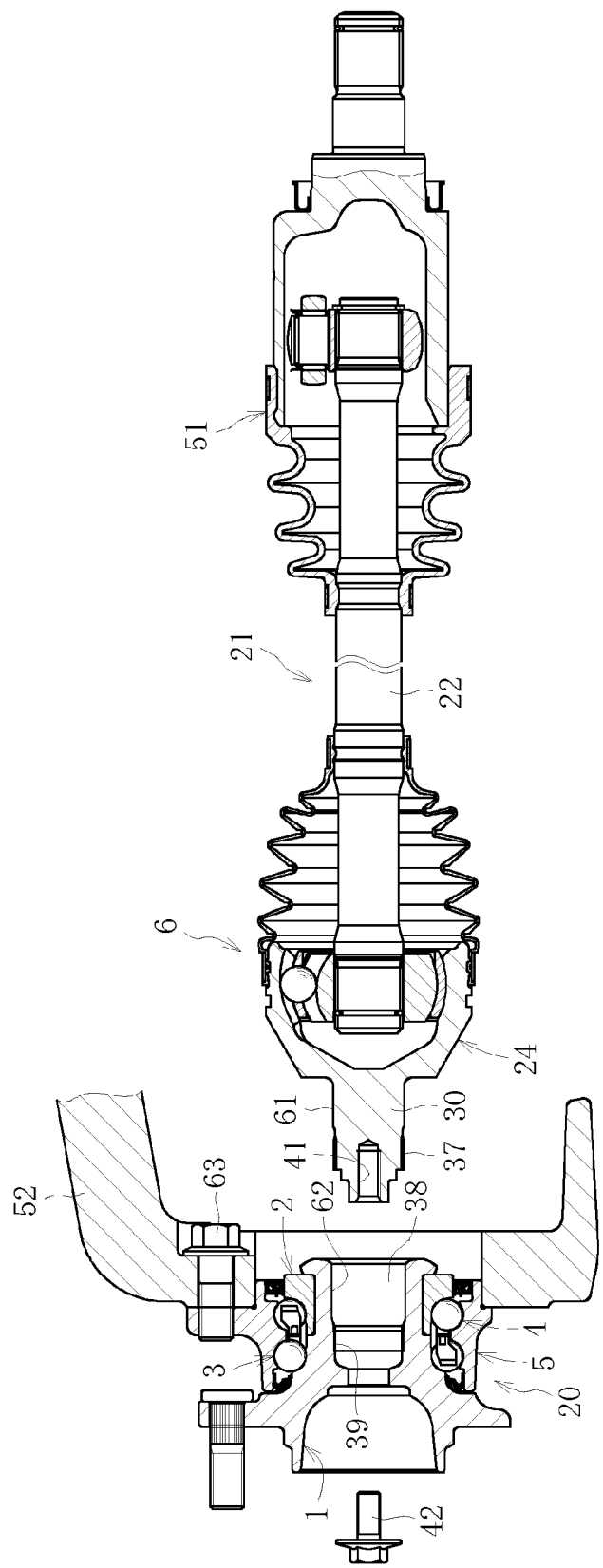
FIG. 3 is a sectional view illustrating a state before assembling the constant velocity universal joint of a drive shaft to the bearing for a wheel, which is mounted to a knuckle.
Figure 5:
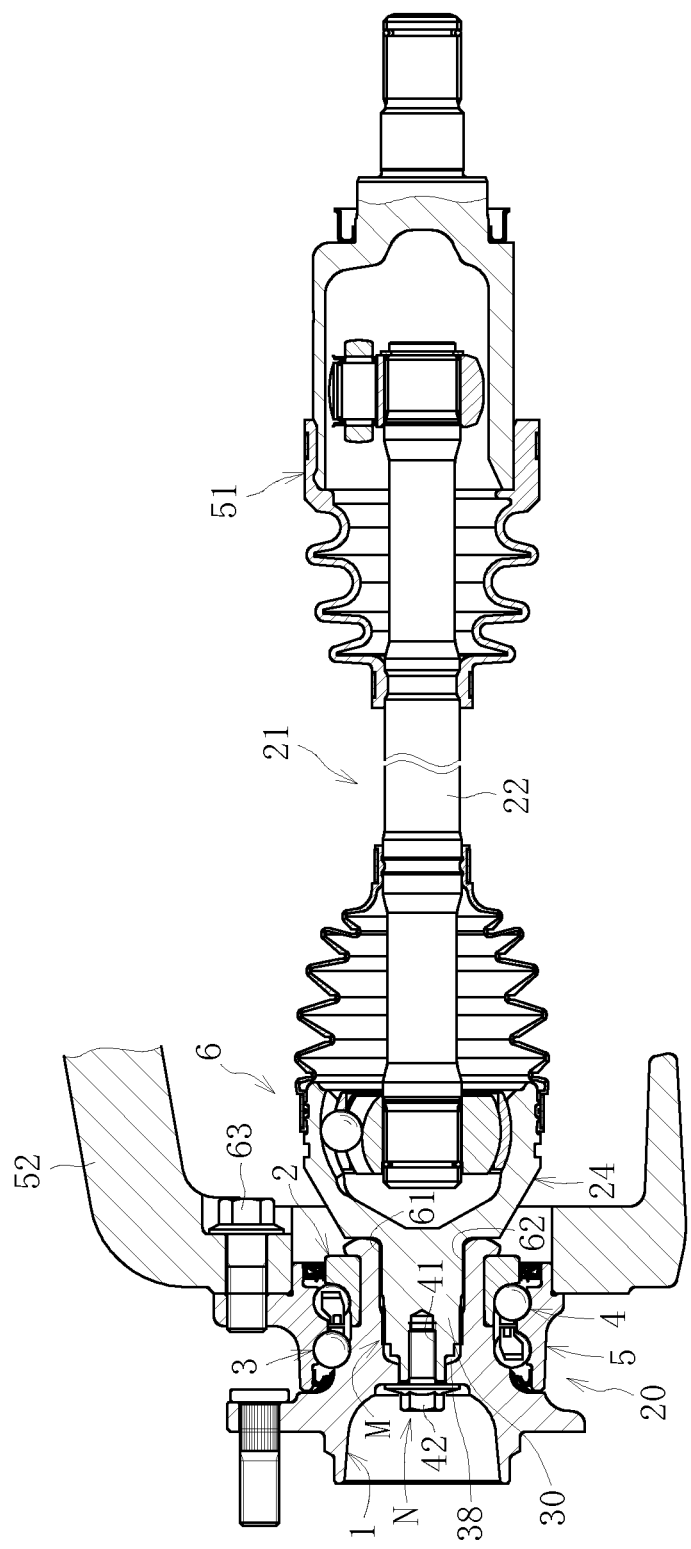
FIG. 5 is a sectional view illustrating a state after assembling the constant velocity universal joint of the drive shaft to the bearing for a wheel, which is mounted to the knuckle.

As a result, as illustrated in FIGS. 3 to 5, the outer joint member 24 can be press-fitted to the hub wheel 1 due to a force that is equal to or smaller than an axial force generated by fastening the bolt 42. That is, at the time of assembling the vehicle in an automobile manufacturer, after the bearing 20 for a wheel is fixed with the bolt 63 to the knuckle 52 extending from the suspension device of the vehicle body, the stem section 30 of the outer joint member 24 of the constant velocity universal joint 6 can easily be press-fitted to the shaft hole 38 of the hub wheel 1 of the bearing 20 for a wheel due to a pull-in force generated by the bolt 42 of the screw fastening structure N, with the result that the constant velocity universal joint 6 of the drive shaft 21 can easily be assembled to the bearing 20 for a wheel. Thus, the workability can be enhanced when assembling the bearing 20 for a wheel to the vehicle body, and the damage to the components can be forestalled at the time of assembling the bearing 20 for a wheel.

As described above, there is no need to separately prepare a dedicated jig when press-fitting the outer joint member 24 to the hub wheel 1 of the bearing 20 for a wheel after the bearing 20 for a wheel is mounted to the knuckle 52 of the vehicle body. Instead, the constant velocity universal joint 6 can easily be coupled to the bearing 20 for a wheel with the bolt 42 that is a component of the bearing device for a wheel. Further, the outer joint member 24 can be press-fitted by applying the relatively small pull-in force, which is equal to or smaller than the axial force generated by fastening the bolt 42, and hence the workability can be enhanced when pulling in the outer joint member 24 with the bolt 42. Still further, there is no need to apply a significant press-fitting load, and hence the damage to (collapse of) the convex and concave portions can be prevented in the convex and concave fitting structure M, with the result that a high-quality and long-life convex and concave fitting structure M can be realized.

When press-fitting the stem section 30 of the outer joint member 24 to the shaft hole 38 of the hub wheel 1, the shape of the circumferential side wall portions 43 of each of the convex portions 37 is transferred to the surface on which the concave portion is formed while involving extremely small plastic deformation and cutting work for the surface on which the concave portion is formed with the circumferential side wall portions 43 of each of the convex portions 37. At this time, the circumferential side wall portions 43 of each of the convex portions 37 dig into the surface on which the concave portion is formed so that the inner diameter of the hub wheel 1 is slightly increased. Thus, relative movement of the convex portions 37 in the axial direction is allowed in this state. When the relative movement of the convex portion 37 in the axial direction is stopped, the inner diameter of the hub wheel 1 is reduced to recover the original diameter. Thus, the convex portions 37 and the concave portions 40 are brought into close contact with each other at the entire fitting contact portion X therebetween, with the result that the outer joint member 24 and the hub wheel 1 can firmly be coupled to and integrated with each other.

Through the coupling thus carried out at low cost with high reliability, any gap that may cause a backlash is not formed in a radial direction and a peripheral direction of the fitting portion between the stem section 30 and the hub wheel 1, and hence the entire fitting contact portion X contributes to rotational torque transmission so that stable torque transmission can be carried out. As a result, annoying gear rattling noise can be prevented over a long period of time. The stem section 30 and the hub wheel 1 are thus brought into close contact with each other at the entire fitting contact portion X therebetween, and hence the strength of the torque transmitting portion is enhanced. As a result, the bearing device for a vehicle is light-weighted and downsized.

When press-fitting the stem section 30 of the outer joint member 24 to the shaft hole 38 of the hub wheel 1, the surface hardness of the convex portions 37 is set larger than the surface hardness of the concave portions 39. In this case, the difference between the surface hardness of the convex portions 37 and the surface hardness of the concave portions 39 is set equal to or larger than 20 HRC. Thus, through the plastic deformation and the cutting work at the time of press fitting, the shape of the circumferential side wall portions 43 of each of the convex portions 37 can easily be transferred to the mating surface on which the concave portion is formed. Note that, it is preferred that the surface hardness of the convex portions 37 be 50 to 65 HRC, and the surface hardness of the concave portions 39 be 10 to 30 HRC.

Figure 7A:
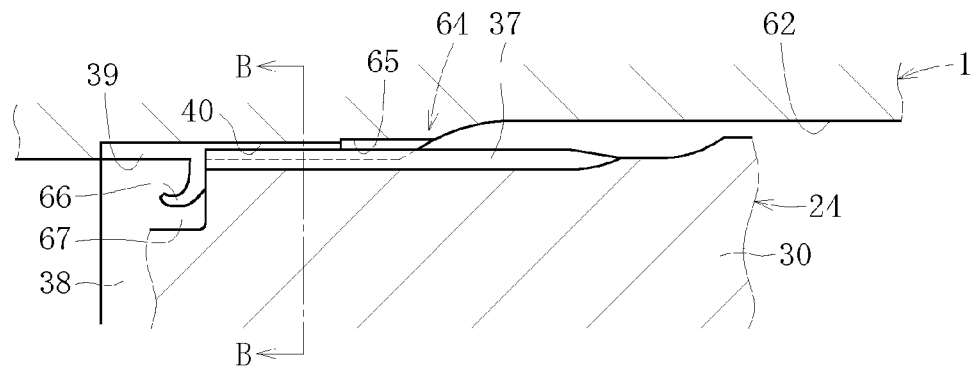
FIG. 7A is an enlarged main part sectional view illustrating a state in the middle of press-fitting the stem section of the outer joint member to the hub wheel of the bearing for a wheel.
Figure 7B:
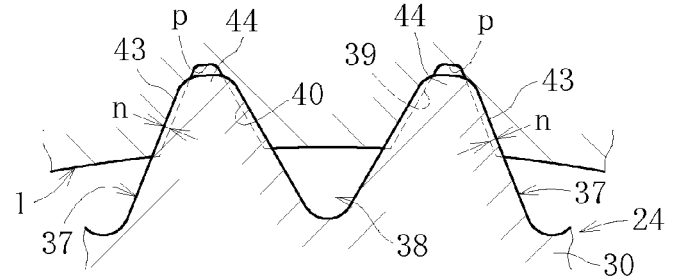
FIG. 7B is a sectional view taken along the line B-B of FIG. 7A.
Figure 8A:
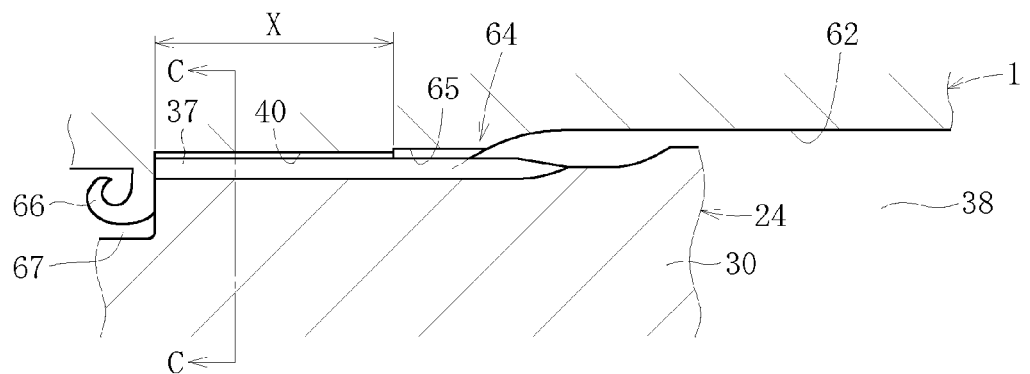
FIG. 8A is an enlarged main part sectional view illustrating a state after press-fitting the stem section of the outer joint member to the hub wheel of the bearing for a wheel.

An accommodating portion 67 for accommodating a flash portion 66 generated due to the transfer of the shape of the convex portions through press fitting is provided between the shaft hole 38 of the hub wheel 1 and the stem section 30 of the outer joint member 24 (see FIGS. 7A and 8A). Thus, the flash portion 66 generated due to the transfer of the shape of the convex portions through press fitting can be kept in the accommodating portion 67, thereby being capable of inhibiting the flash portion 66 from entering, for example, the inside of the vehicle that is positioned outside the device. The flash portion 66 is kept in the accommodating portion 67, and hence the process of removing the flash portion 66 becomes unnecessary so that the number of working steps can be reduced. As a result, the workability can be enhanced and the cost can be reduced.

Figure 8B:
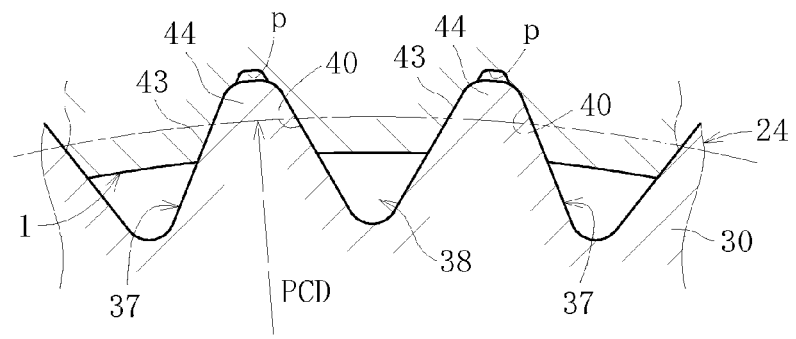
FIG. 8B is a sectional view taken along the line C-C of FIG. 8A.
Figure 9:
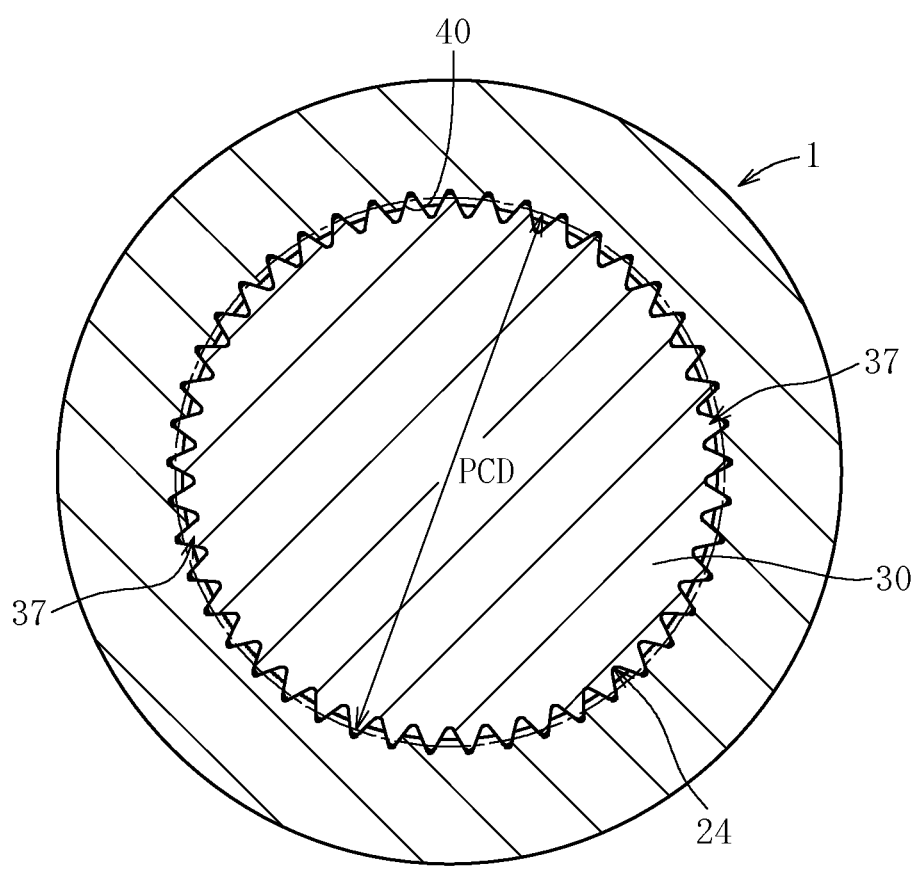
FIG. 9 is a lateral sectional view illustrating the hub wheel and the stem section after assembling the constant velocity universal joint of the drive shaft to the bearing for a wheel of FIG. 1.

In the above-mentioned convex and concave fitting structure M, a module is defined within a range of from 0.3 to 0.75. The module herein means a value obtained by dividing, by a number Z of the convex portions 37 (number of teeth), a pitch circle diameter (PCD) of the fitting structure between the convex portions 37 formed on the outer peripheral surface of the stem section 30 of the outer joint member 24 and the concave portions 40 formed in the inner peripheral surface of the shaft hole 38 of the hub wheel 1 as illustrated in FIGS. 8B and 9 (PCD/Z). In the related-art convex and concave fitting structure in which the shape of the convex portions 137 is transferred to the cylindrical portion 139 (see FIG. 13), the module of the convex and concave fitting structure is set to about 1.0, whereas the module of the convex and concave fitting structure M according to this embodiment is defined within the range of from 0.3 to 0.75.

When the module of the convex and concave fitting structure M is defined within the range of from 0.3 to 0.75 as described above, the convex portions 37 of the stem section 30 of the outer joint member 24 and the concave portions 40 of the shaft hole 38 of the hub wheel 1 mesh with each other reliably, thereby being capable of sufficiently securing a torque transmission capacity between the bearing 20 for a wheel and the constant velocity universal joint 6. Further, the press-fitting load to be applied when press-fitting the stem section 30 of the outer joint member 24 to the shaft hole 38 of the hub wheel 1 can be reduced reliably, thereby being capable of easily press-fitting the stem section 30 of the outer joint member 24 to the shaft hole 38 of the hub wheel 1 due to the pull-in force generated by the bolt 42 of the screw fastening structure N.

Note that, when the module of the convex and concave fitting structure M is smaller than 0.3, the fitting interference of the concave portions 39 with respect to the convex portions 37 becomes excessively small, with the result that it becomes difficult to secure a sufficient torque transmission capacity between the bearing 20 for a wheel and the constant velocity universal joint 6. When the module of the convex and concave fitting structure M is larger than 0.75, conversely, the fitting interference of the concave portions 39 with respect to the convex portions 37 becomes excessively large, with the result that it becomes difficult to reduce the press-fitting load to be applied when press-fitting the stem section 30 of the outer joint member 24 to the shaft hole 38 of the hub wheel 1, and therefore difficult to press-fit the stem section 30 of the outer joint member 24 to the shaft hole 38 of the hub wheel 1 due to the pull-in force generated by the bolt 42 of the screw fastening structure N.

Further, in the convex and concave fitting structure M, as illustrated in FIGS. 8A and 9, the ratio of the pitch circle diameter (PCD) to an axial length of the entire fitting contact portion (hereinafter referred to simply as "fitting length") X is defined within a range of from 2.0 to 3.0. The ratio of the pitch circle diameter to the fitting length herein means a value obtained by dividing the pitch circle diameter PCD by the fitting length X (i.e., PCD/X). In the related-art convex and concave fitting structure in which the shape of the convex portions 137 is transferred to the cylindrical portion 139 (see FIG. 13), the ratio of the pitch circle diameter to the fitting length is set smaller than 1.0, whereas the ratio of the pitch circle diameter to the fitting length in the convex and concave fitting structure M according to this embodiment is defined within the range of from 2.0 to 3.0.

When the ratio of the pitch circle diameter to the fitting length is defined within the range of from 2.0 to 3.0 as described above, the press-fitting load to be applied when press-fitting the stem section 30 of the outer joint member 24 to the shaft hole 38 of the hub wheel 1 can be reduced reliably, thereby being capable of easily press-fitting the stem section 30 of the outer joint member 24 to the shaft hole 38 of the hub wheel 1 due to the pull-in force generated by the bolt 42 of the screw fastening structure N. Further, the shear strength of the convex portions 37 can be enhanced as compared to the failure strength of the stem section 30 of the outer joint member 24, thereby being capable of securing a sufficient strength in the convex and concave fitting structure M.

Note that, when the ratio of the pitch circle diameter to the fitting length is smaller than 2.0, the fitting length becomes excessively large as compared to the pitch circle diameter, with the result that it becomes difficult to reduce the press-fitting load to be applied when press-fitting the stem section 30 of the outer joint member 24 to the shaft hole 38 of the hub wheel 1 due to the pull-in force generated by the bolt 42 of the screw fastening structure N, and therefore difficult to press-fit the stem section 30 of the outer joint member 24 to the shaft hole 38 of the hub wheel 1. Further, it becomes difficult to achieve a compact and lightweight device. When the ratio of the pitch circle diameter to the fitting length is larger than 3.0, conversely, the fitting length becomes excessively small as compared to the pitch circle diameter, and hence the shear strength of the convex portions 37 becomes lower than the failure strength of the stem section 30 of the outer joint member 24, with the result that it becomes difficult to secure a sufficient strength in the convex and concave fitting structure M.

Figure 10:
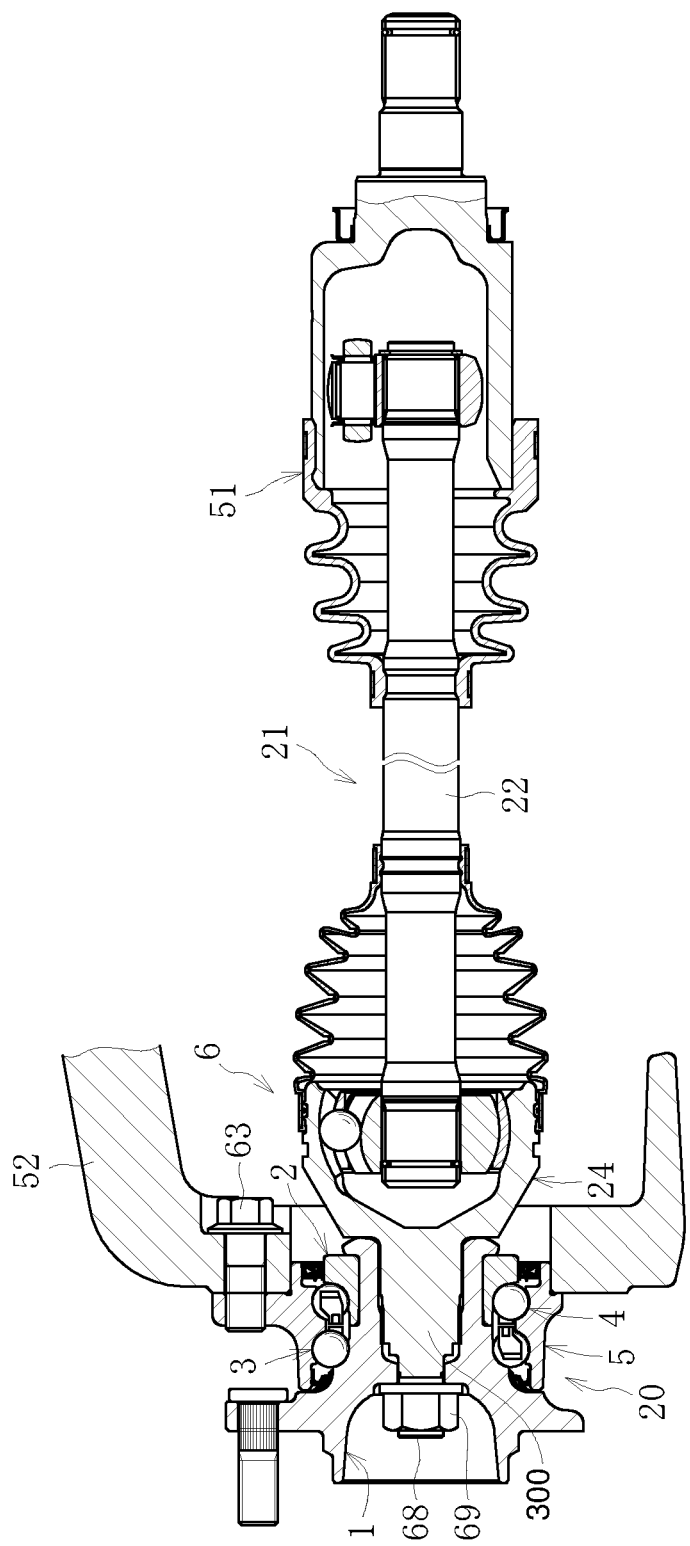
FIG. 10 is a sectional view illustrating a state after assembling a constant velocity universal joint of a drive shaft to a bearing for a wheel, which is mounted to a knuckle, in a bearing device for a wheel according to another embodiment of the present invention.
Figure 11:
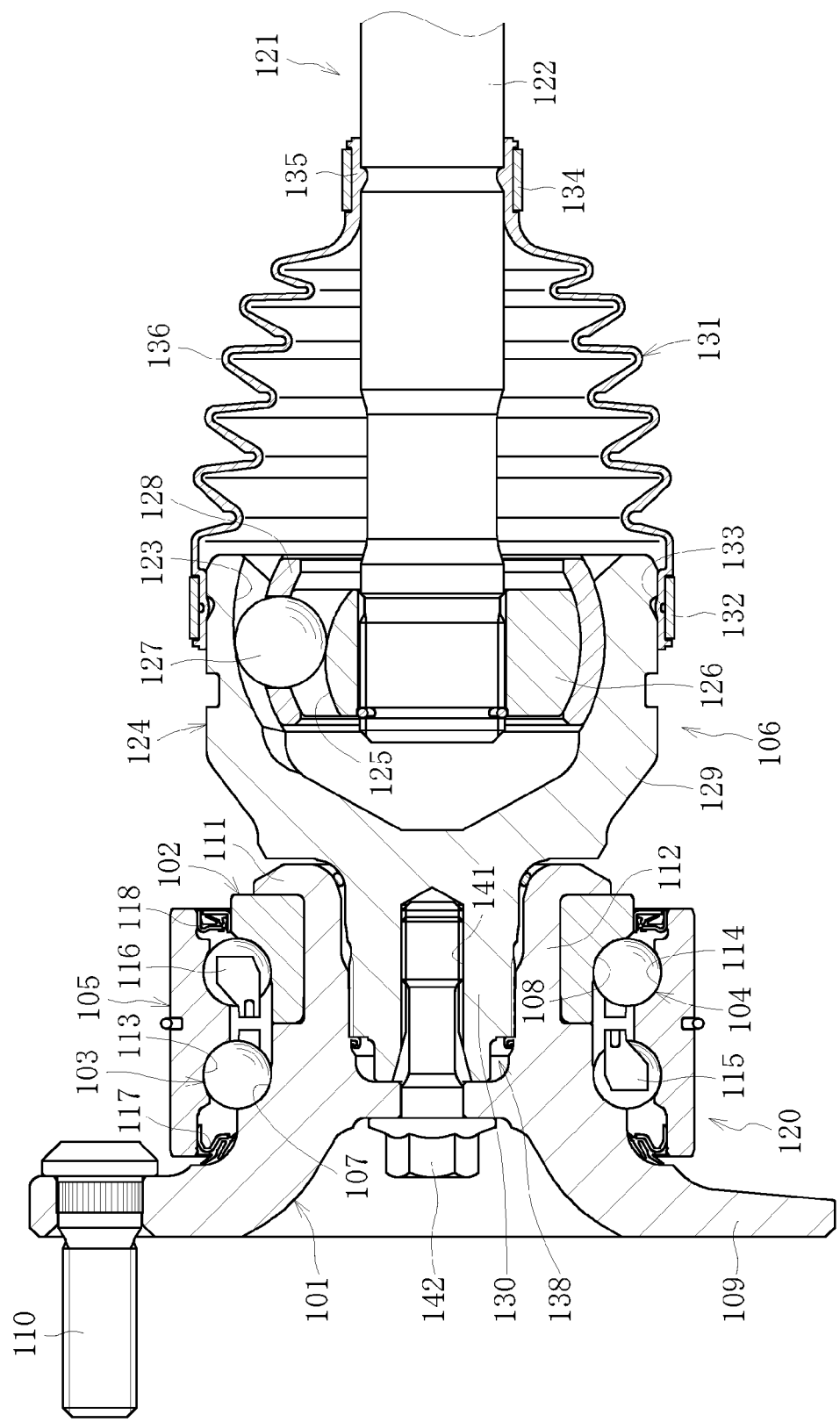
FIG. 11 is a vertical sectional view illustrating an overall structure of a related-art bearing device for a wheel.

In the embodiment described above, there is exemplified a structure in which the bolt 42 is threadedly engaged with the female thread portion 41 of the stem section 30 and therefore fastened in a state of being locked at the end surface of the hub wheel 1. As an alternative screw fastening structure, as illustrated in FIG. 10, there may be provided a structure comprising a male thread portion 68 formed at the axial end of a stem section 300 of the outer joint member 24, and a nut 69 serving as a female thread portion to be locked at the end surface of the hub wheel 1 in a state of being threadedly engaged with the male thread portion 68. In this structure, the nut 69 is threadedly engaged with the male thread portion 68 of the stem section 300, and is therefore fastened in a state of being locked at the hub wheel 1, to thereby fix the constant velocity universal joint 6 to the hub wheel 1.

Further, in the embodiment described above, there is exemplified a case where the present invention is applied to a bearing device for a driving wheel of the type in which one of the double-row inner raceway surfaces 7 and 8 formed on the inner member comprising the hub wheel 1 and the inner race 2, that is, the inner raceway surface 7 on the outboard side is formed on the outer periphery of the hub wheel 1 (referred to as "third generation"). However, the present invention is not limited thereto, but is also applicable to a bearing device for a driving wheel of the type in which a pair of inner races is press-fitted to the outer periphery of the hub wheel and the raceway surface 7 on the outboard side is formed on the outer periphery of one of the inner races, while the raceway surface 8 on the inboard side is formed on the outer periphery of the other of the inner races (referred to as "first and second generations").

The present invention is not limited to the embodiments described above, and as a matter of course, may be carried out in various other embodiments without departing from the spirit of the present invention. The scope of the present invention is defined in the scope of claims, and encompasses meaning of equivalents of elements described in the scope of claims and all modifications in the scope of claims.

The invention claimed is:

1. A bearing device for a wheel, comprising a bearing for a wheel comprising:
   an outer member having double-row outer raceway surfaces formed on an inner periphery thereof;
   an inner member comprising a hub wheel and an inner race, the inner member having double-row inner raceway surfaces formed on an outer periphery thereof so as to be opposed to the double-row outer raceway surfaces; and
   double-row rolling elements interposed between the double-row outer raceway surfaces of the outer member and the double-row inner raceway surfaces of the inner member,
   the bearing for the wheel having a constant velocity universal joint separably coupled thereto with a screw fastening structure, in which a stem section of an outer joint member of the constant velocity universal joint is fitted to an inner diameter portion of the hub wheel,
   wherein a plurality of convex portions extending in an axial direction are formed on one of the hub wheel and the stem section of the outer joint member, a plurality of concave portions having an interference with respect to only circumferential side wall portions of the plurality of convex portions are formed on another of the hub wheel and the stem section of the outer joint member prior to an initial press-fitting of the hub wheel and the stem section, the stem section of the outer joint member is press-fitted to the hub wheel, and a shape of only the circumferential side wall portions of each of the plurality of convex portions is transferred to the another of the hub wheel and the stem section of the outer joint member, to thereby provide a convex and concave fitting structure in which the plurality of convex portions and the plurality of concave portions are brought into close contact with each other at an entire fitting contact portion therebetween, wherein surfaces of the concave portions are cut only by the circumferential side wall portions of the convex portions fitted therein, wherein a clearance is formed between a distal end portion of each of the convex portions and a corresponding one of the concave portions, and wherein flash portions are formed on the another of the hub wheel and the stem section of the outer joint member, the flash portions having a shape that is formed by the cutting of the surfaces of the concave portions by only the circumferential side wall portions of the convex portions.

2. The bearing device for the wheel according to claim 1, wherein a circumferential dimension of each of the plurality of concave portions having the interference with respect to only the circumferential side wall portions of one of the plurality of convex portions is set smaller than a circumferential dimension of each of the plurality of convex portions.

3. The bearing device for the wheel according to claim 1, wherein a surface hardness of the each of the plurality of convex portions is set larger than a surface hardness of the each of the plurality of concave portions.

4. The bearing device for the wheel according to claim 1, wherein a module of the convex and concave fitting structure is defined within a range of from 0.3 to 0.75.

5. The bearing device for the wheel according to claim 1, wherein a ratio of a pitch circle diameter to a fitting length in the convex and concave fitting structure is defined within a range of from 2.0 to 3.0.

6. The bearing device for the wheel according to claim 1, wherein the outer joint member is configured to be press-fitted to the hub wheel due to a force that is equal to or smaller than an axial force generated by the screw fastening structure.

7. The bearing device for the wheel according to claim 1, wherein a fastening torque of the screw fastening structure is set lower than the fastening torque of the screw fastening structure to be applied at the time of press-fitting the outer joint member to the hub wheel.

8. The bearing device for the wheel according to claim 1, wherein the screw fastening structure comprises:
a female thread portion formed at an axial end of the stem section of the outer joint member; and
a male thread portion to be locked at the hub wheel in a state of being threadedly engaged with the female thread portion.

9. The bearing device for the wheel according to claim 1, wherein the screw fastening structure comprises:
a male thread portion formed at an axial end of the stem section of the outer joint member; and
a female thread portion to be locked at the hub wheel in a state of being threadedly engaged with the male thread portion.

10. The bearing device for the wheel according to claim 1,
wherein the plurality of convex portions are provided on the stem section of the outer joint member, and
wherein the plurality of concave portions are provided on the hub wheel.

11. The bearing device for the wheel according to claim 1, wherein the convex and concave fitting structure comprises an accommodating portion for accommodating the flash portions.

12. The bearing device for the wheel according to claim 1, wherein the convex and concave fitting structure further comprises a guide portion for guiding a start of the press fitting.

13. A method for manufacturing a bearing device for a wheel, comprising a bearing for a wheel comprising:
an outer member having double-row outer raceway surfaces formed on an inner periphery thereof;
an inner member comprising a hub wheel and an inner race, the inner member having double-row inner raceway surfaces formed on an outer periphery thereof so as to be opposed to the double-row outer raceway surfaces; and
double-row rolling elements interposed between the double-row outer raceway surfaces of the outer member and the double-row inner raceway surfaces of the inner member,
the bearing for the wheel having a constant velocity universal joint separably coupled thereto with a screw fastening structure, in which a stem section of an outer joint member of the constant velocity universal joint is fitted to an inner diameter portion of the hub wheel,
the method comprising:
forming a plurality of convex portions extending in an axial direction on one of the hub wheel and the stem section of the outer joint member;
forming a plurality of concave portions having an interference with respect to only circumferential side wall portions of the plurality of convex portions on another of the hub wheel and the stem section of the outer joint member prior to an initial press-fitting of the hub wheel and the stem section; and
press-fitting the stem section of the outer joint member to the hub wheel, by an axial force of a convex and concave fitting structure, wherein surfaces of the concave portions are cut only by the circumferential side wall portions of the convex portions press-fitted therein so as to form a clearance between a distal end portion of each of the convex portions and a corresponding one of the concave portions, and to bring the plurality of convex portions and the plurality of concave portions into close contact with each other at an entire fitting contact portion therebetween.

* * * * *